(12) United States Patent
Mehta et al.

(10) Patent No.: US 9,197,129 B2
(45) Date of Patent: Nov. 24, 2015

(54) BOOST CONVERTER TOPOLOGY FOR HIGH EFFICIENCY AND LOW BATTERY VOLTAGE SUPPORT

(71) Applicant: QUALCOMM Incorporated, San Diego, CA (US)

(72) Inventors: Narendra S Mehta, Santa Clara, CA (US); Sandeep Chaman Dhar, San Diego, CA (US); Todd R Sutton, Del Mar, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 251 days.

(21) Appl. No.: 13/752,294

(22) Filed: Jan. 28, 2013

(65) Prior Publication Data

US 2014/0210366 A1     Jul. 31, 2014

(51) Int. Cl.
*H05B 33/08* (2006.01)
*H02M 3/158* (2006.01)

(52) U.S. Cl.
CPC ........... *H02M 3/158* (2013.01); *H05B 33/0815* (2013.01); *H05B 33/0842* (2013.01); *Y02B 20/346* (2013.01)

(58) Field of Classification Search
CPC ........................... H02M 3/158; H05B 33/0842
See application file for complete search history.

(56) References Cited

U.S. PATENT DOCUMENTS

| | | | |
|---|---|---|---|
| 6,188,274 B1 | 2/2001 | Vernon | |
| 7,151,433 B2 | 12/2006 | Chun | |
| 7,977,927 B2 | 7/2011 | Williams | |
| 8,106,597 B2 | 1/2012 | Mednik et al. | |
| 2001/0043060 A1* | 11/2001 | Brandt | 323/282 |
| 2003/0071602 A1 | 4/2003 | Ando | |
| 2007/0097719 A1* | 5/2007 | Parramon et al. | 363/72 |
| 2008/0278136 A1* | 11/2008 | Murtojarvi | 323/299 |
| 2010/0033109 A1 | 2/2010 | Liu et al. | |
| 2011/0062889 A1 | 3/2011 | Hoogzaad et al. | |
| 2012/0239112 A1* | 9/2012 | Muraoka | 607/49 |
| 2013/0093514 A1* | 4/2013 | Xu et al. | 330/129 |

FOREIGN PATENT DOCUMENTS

CN     101647182 A     2/2010

OTHER PUBLICATIONS

International Search Report and Written Opinion—PCT/US2014/012744—ISA/EPO—Mar. 2, 2015.
Nurzad, D., "Optimizing Efficiency in White LED Backlight Applications", EDN; ProQuest Research Library, Aug. 2006, 4pgs.

* cited by examiner

*Primary Examiner* — Thuy Vinh Tran
*Assistant Examiner* — Pedro C Fernandez
(74) *Attorney, Agent, or Firm* — Fountainhead Law Group P.C.

(57) ABSTRACT

A method and apparatus for a boost converter topology for low battery voltage support. In the method, an input voltage is boosted by closing first through third switches and then opening a fourth switch to charge a capacitor. The first and second switches are then opened. The voltage is then doubled by closing the third and fourth switches to discharge the first capacitor into a second capacitor and charging a third capacitor. A further embodiment provides an additional method for selectively boosting an input voltage to an electronic device. The method first characterizes the efficiency of a circuit, and then determines a crossover point for a ratio of output voltage to input voltage, and then enabling or disabling a voltage boost converter based on the crossover point.

20 Claims, 4 Drawing Sheets

BOOST CONVERTER TOPOLOGY FOR HIGH EFFICIENCY AND LOW BATTERY VOLTAGE SUPPORT

BACKGROUND

1. Field

The present disclosure relates generally to battery devices, and more particularly for a boost converter topology for high efficiency and low battery voltage support.

2. Background

Wireless devices and smart phones are increasingly used for a wide variety of tasks such as making and receiving calls, accessing and sending email, retrieving data, as well as entertainment. These enhanced features often require significant amounts of battery power. Often these phones have improved touchscreen displays for better viewing experiences.

Future generation batteries are progressing towards a technology (such as silicon anode) which can retain significant usable charge down to 2.5 volts. At low input voltages ($V_{in}$), conventional boost operation becomes significantly less efficient, and with some topologies boost operation is unable to deliver the desired current without going to significantly high coil inductance and/or switching technologies.

Silicon anode technology for new batteries uses high performance lithium ion batteries. Silicon anodes have the highest known theoretical charge capacity, much more charge capacity than current conventional anodes.

In addition, driving the need for efficient boost operation is the increasing use of high density displays. These high density displays provide an increased used experience and better viewing, which is especially useful for some applications. The dominant market segment of these displays use a matrix configuration of White Light Emitting Diode (WLED) to backlight the display. As the display density increases, there is a direct correlation to the increase in the number of WLEDs used for the backlight and consequently an increase in the backlight power consumption. Since a WLED typically has an operating voltage of 3V, several of these WLEDs are stacked in a series configuration and this requires the battery voltage to be boosted up to power the WLED stack. With an increasing number of WLEDs in the display the power consumption of the boost converter power operation becomes a significant portion of the total system power. Run time efficiency and the ability to boost efficiently from very low battery voltages needs to be improved to make better use of the capabilities of the newer generation of batteries.

There is a need in the art for improvement in total run time by increasing the efficiency of the WLED boost converters, particularly when used with silicon anode batteries.

SUMMARY

The method begins when a voltage is applied across an inductor as a first switch is closed. During the application of the voltage a second switch and a third switch are closed and a fourth switch is opened. Next, a first capacitor is charged toward a selected output voltage. The first switch is then opened, which causes a rise in voltage to a value that is sufficient to conduct a diode. Once this occurs, the second switch is opened and a fourth switch is closed. A second capacitor may then be charged to twice the selected output voltage.

A further embodiment provides an additional method for selectively boosting an input voltage to an electronic device. The method comprises the steps of characterizing the efficiency of a circuit, determining a crossover point for a ratio of output voltage to input voltage, and then enabling or disabling a voltage boost converter based on the crossover point.

An apparatus for boosting an input voltage to an electronic device is also provided. The apparatus includes an inductive step converter and a switched capacitor circuit, and a battery.

A still further embodiment provides an apparatus for a boost converter topology for low battery voltage support. The apparatus provides for means for an input voltage to be boosted by closing first through third switches and then opening a fourth switch to charge a capacitor. The apparatus further provides means for opening first and second switches along with means for opening a third switch in order to hold a charge on a first capacitor. The voltage is then doubled by activating means for closing the first and second switches to discharge the first capacitor into a second capacitor and means for charging a third capacitor.

Yet a further embodiment provides a non-transitory computer-readable medium that contains instructions for causing a processor to perform the steps of: closing first through third switches, opening a fourth switch to charge a capacitor; opening first and second switches, opening the third switch to hold a charge on the capacitor, doubling an output voltage by closing the first and second switches to discharge the first capacitor into a second capacitor and then charging the third capacitor.

A further embodiment provides a non-transitory computer-readable medium that contains instructions, that when executed by a processor cause the processor to perform the following steps: characterize the efficiency of a circuit; determine a crossover point for a ratio of output voltage to input voltage; and enable or disable a voltage boost converter based on the crossover point.

DETAILED DESCRIPTION

Figure 1:
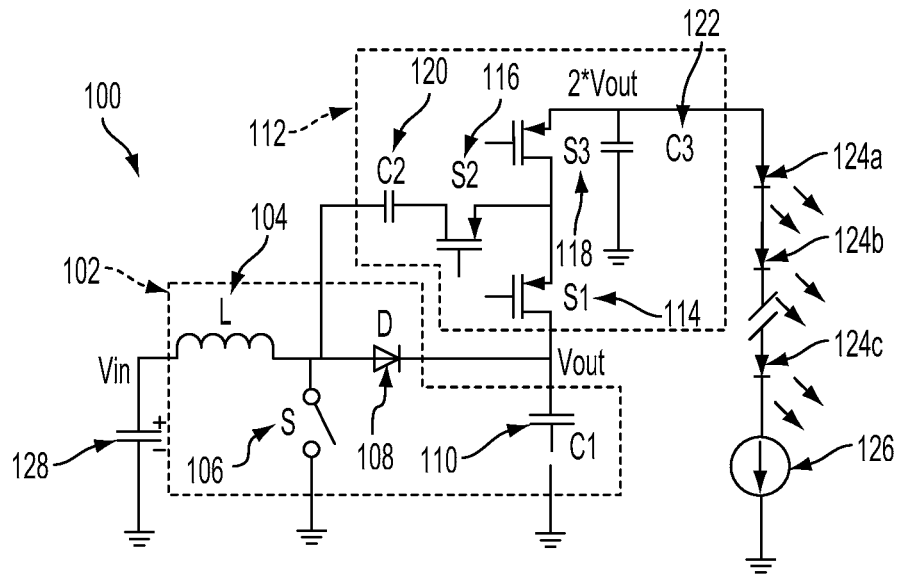
FIG. 1 illustrates a boost converter for low battery voltage according to an embodiment.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

A boost converter, or step-up converter is a power converter with an output DC voltage greater than the input DC voltage. It is a class of switching-mode power supply (SMPS) containing at least two semiconductor switches (a diode and a transistor) and at least one energy storage element. Filters made of capacitors, which may also be in combination with inductors are normally added to the output of the converter to reduce output voltage ripple.

For higher efficiency the SMPS switch must turn on and off quickly and have low losses. Battery powered systems may stack cells in order to achieve higher voltages. While this option may be useful in many applications, it is often not feasible in mobile devices. Mobile devices have specific and often limiting form factors and a thick stack of batteries can increase the overall size and thickness of the device to an unacceptable size. Boost converters can increase voltage and reduce the number of cells needed, making them a good design choice for a wireless device application.

A white light emitting diode (WLED) typically operates at 3V when used as a backlight for displays. A boost converter can step up the voltage from a single 1.5 volt alkaline cell or a 3.6V lithium ion battery to provide enough power to power the diode.

The operating principle that drives a boost converter is the tendency of an inductor to resist changes in current. When being charged the inductor acts as a load and absorbs energy, and when being discharged, the inductor acts as an energy source. The voltage produced during the discharge phase is related to the rate of change of the current, and is not related to the original charging voltage, thus allowing for different input and output voltages.

FIG. 1 illustrates an inductive boost converter circuit with an assisted switched capacitive doubler circuit. The embodiment circuit 100 consists of an inductive step converter 102 and a switched capacitor circuit 112. Inductive step converter is comprised of inductor L 104, switch S 106, diode D 108, and capacitor C1 110. Switched capacitor circuit consists of switches S1 114, S2 116, and S3 118 as well as capacitors C2 120 and C3 122. Switches S1 114, S2 116, and S3 118 are controlled as described further below and are controlled such that a boosted output voltage of $V_{OUT}$ or $2*V_{OUT}$ is available on output capacitor C3 122.

In this embodiment, switch S2 serves as a enabler for the doubler mode. When switch S2 is closed, doubling operating takes place at the output C3 (2*Vout). When switch S2 is open, the capacitor C2 cannot be charged and doubling operation is disabled In FIG. 1 $V_{IN}$ is provided to inductor L1 104. When all switches are open, the input voltage Vin after passing through inductor L1 104 and the Schottky diode D 108, results in an output as $V_{OUT}$~VIN. In this pass through the inductive step converter 102, no doubling or boosting of the voltage occurs.

The operation commences when in FIG. 1, Vin is applied across the inductor L as switch S is closed. During this operation, switches S1 and S2 are closed while S3 is open. There is now a conductive path from capacitor C1 and switches S1 and S2 that charge up capacitor C2 towards Vout.

With the doubling mode enabled (switch S2 is closed), switch S is now opened. As described earlier, an inductor will resist a change in current. This forces the switch S node to rise to a voltage that is sufficient to conduct the Schottky diode, hereby implying that node S is at the voltage Vout. There is a voltage drop across the Schottky diode (typically 0.4V) which is small compared to the output voltage and for the purpose of analysis it is convenient to ignore this Schottky diode drop With the switch S node at Vout and capacitor C2 charged at Vout, switch S1 is opened and switch S3 is closed. This charges capacitor C3 to 2*Vout and also provides the current (shown as the current sink 126) to the series connection of LEDs 124a, 124b and 124c.

The operation continues at a high switching rate such that the voltage drop at the capacitors is minimized and for all purposes can be considered to be at steady state value of Vout (across C1), Vout (across capacitor C2) and 2*Vout (across C3).

In the mode where doubling is disabled, switch S2 is open. Operation of the inductive boost proceeds as described earlier. However, when the switch S turns off, Schottky diode D conducts to charge C1 towards Vout and switches S1 and S3 close to also charge capacitor C3 to Vout. In an embodiment of this circuit, switches S1 and S3 are closed and effectively placing capacitors C1 and C3 are in parallel.

Figure 2:
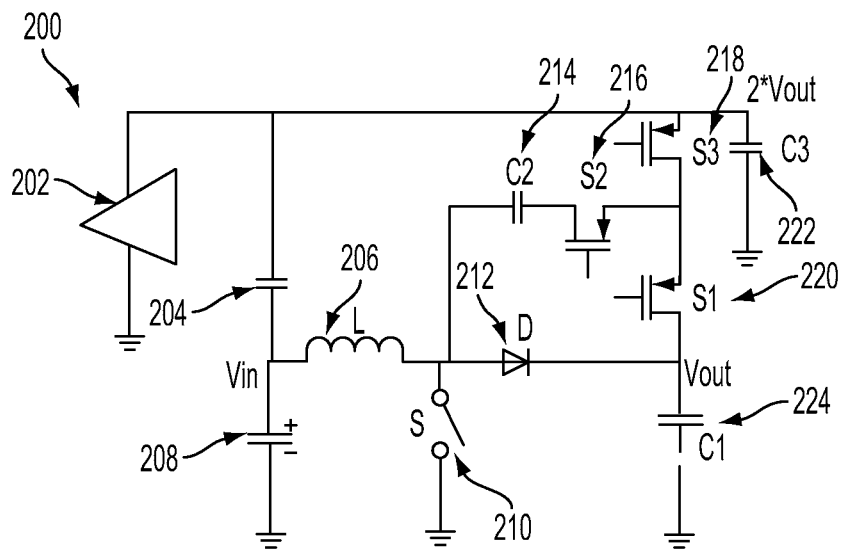
FIG. 2 illustrates an alternative boost converter for low battery voltage according to a further embodiment.

FIG. 2 depicts a boosted output voltage that is used to temporarily elevate the battery voltage using a storage capacitor. The apparatus 200, includes amplifier 202, which is connected to capacitor 204, which is the storage capacitor and is used to temporarily elevate the battery voltage. The input voltage $V_{IN}$ is connected to battery 208 and inductor L 206. Inductor L 206 is connected to S 210, D1 212, and C2 214. C2 214 is also connected to switch S2 216. S2 216 is connected also to S1 220 and S3 218. S1 220 is also connected to C1 224. S3 218 is connected to C3 222.

The amplifier may operate from the range of the temporarily elevated battery voltage down to the input voltage Vin.

When the amplifier is conducting, it is first drawing charge from capacitor 204 and only when the capacitor charge is depleted it is directly drawing current from the battery.

In an embodiment of this circuit, capacitor 204 is selectively charged up to 2*Vout in expectation of a large current draw from the amplifier 202. By using the embodiment, the battery input Vin, is isolated from the current demands of the amplifier while the storage capacitor 204 provides the supply current. Isolating the battery input VIN from the effects of the amplifier also implies that other circuits operating from VIN do not see adverse effects of a large load current draw from amplifier 202.

Figure 3:
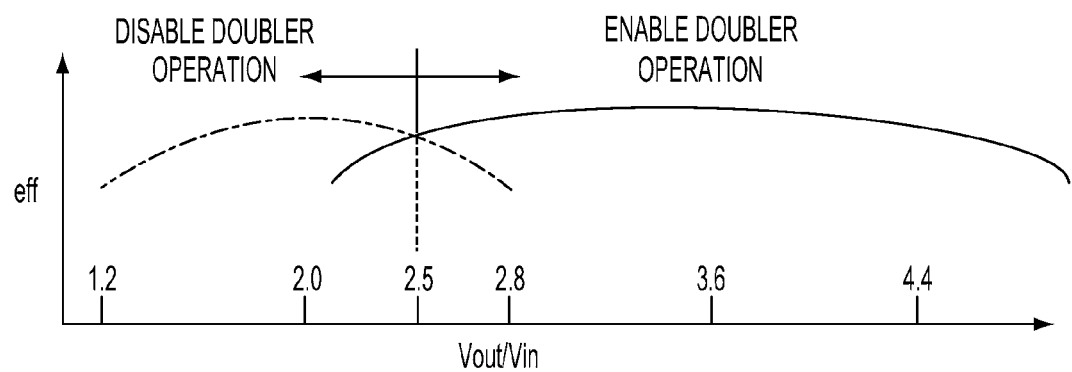
FIG. 3 shows the doubler enabled operation range and the disabled doubler operation ranges according to an embodiment.

FIG. 3 illustrates when voltage doubler operation is advantageous. When the ratio of output voltage to input voltage is high, that is, greater than 2, operating the doubler is very advantageous to efficiency. When the ratio of output voltage to input voltage is between one and 2, the doubler should not be operated, as efficiency will be adversely affected. This is shown by the operation curve, which shows the efficiency as a function of the input/output conversion ratio. As can be seen from FIG. 3, the objective of the embodiment is to follow the efficiency curve from the non-doubler operation to the doubler operation and vice versa, hence preventing a significant degradation in the efficiency. The Vout/Vin conversion ratio will vary depending on the needs of the output and battery voltage variation over time. Since a WLED is controlled by current, the forward drop of the WLED and consequently the output voltage will change as a function of the brightness. Hence a wide variation in the Vout/Vin conversion ratio is possible for a given application. With this embodiment a switch is made from doubler mode to non-doubler mode with a-priori knowledge of the input and output voltage conditions in the system.

Figure 4:
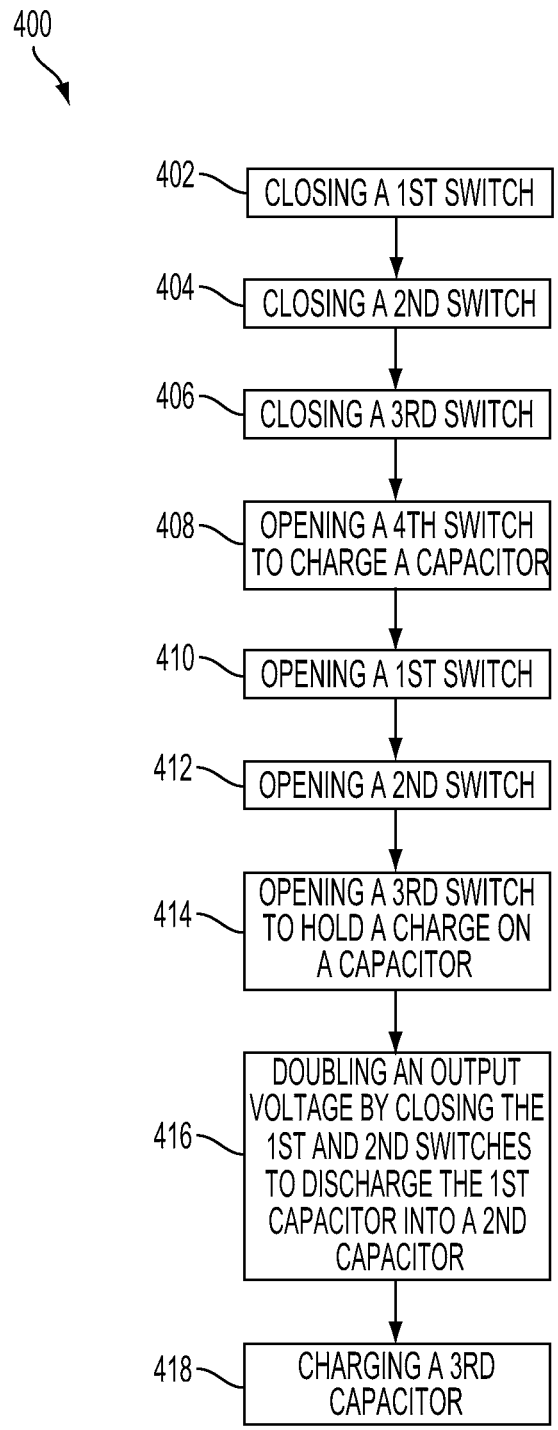
FIG. 4 is a flow chart of a method of operating a boost converter according to an embodiment.

FIG. 4 provides a flow chart of the operation of the voltage doubler. The method 400 begins when a first switch is closed in step 402. A second switch is closed in step 404. A third switch is closed in step 406. A fourth switch is opened to charge a capacitor in step 408. The first switch is opened in step 410. A second switch is opened in step 412. The output voltage is doubled by closing the third and fourth switches to discharge the first capacitor into a second capacitor in step 416. The third capacitor is then charged in step 418.

Figure 5:
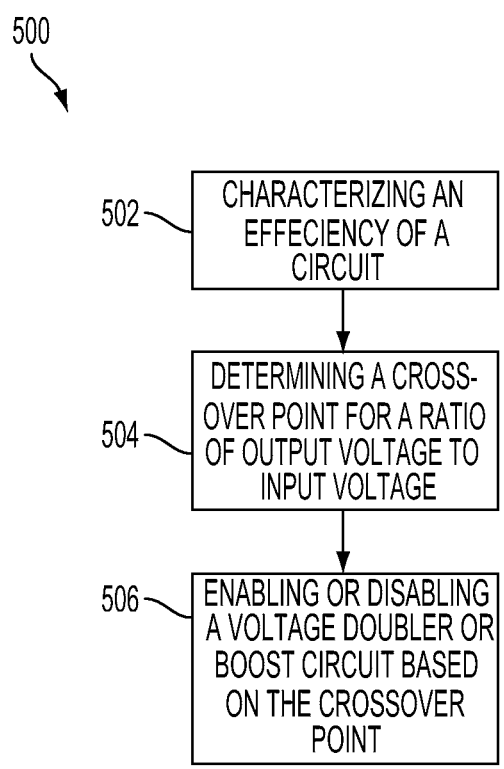
FIG. 5 is a flow chart of a further method of operating a boost converter according to an embodiment.

FIG. 5 provides a further embodiment of a method of operating a boost converter or doubler. The method 500 begins with characterizing the efficiency of the circuit in step 502. A crossover point for a ratio of output voltage to input voltage is determined in step 504. The doubler is enabled or disabled based on the crossover point in step 506.

The efficiency characteristics of the circuit to for the ratio of output voltage to input voltage may be characterized and is independent of a given application. As a result, it is possible to select a $V_{out}/V_{IN}$ crossover point for enabling or disabling doubler operation. In the environment of a power management integrated circuit (PMIC) with a software interface, obtaining the $V_{out}/V_{IN}$ ratio and as a result, the crossover point can be readily implemented and may be applied to and LED panel display, as well as used in future low battery voltage based solutions.

Embodiments described herein provide a number of advantages over current boost techniques. The embodiments described herein use power field effect transistors (PFET). The doubler or boost circuit may be enabled or disabled using a single switch. A further advantage allows the crossover point to be determined from boost to boost plus doubler. The embodiments maintain high efficiency over a wide range of $V_{out}/V_{IN}$. In addition, the application range may be used this regulator as a voltage source or current source.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for boosting an input voltage to an electronic device, comprising:
    applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node;
    charging a first capacitor toward a selected output voltage, wherein the first capacitor is coupled to the first node and the fourth node;
    opening the first switch, causing a rise in voltage to a value sufficient to conduct a diode, wherein the diode is coupled to the first node and the second node;
    opening the second switch and closing the fourth switch; and
    charging a second capacitor to twice the selected output voltage, wherein the second capacitor is coupled to the fifth node.

2. The method of claim 1 further comprising driving a stack of light emitting diodes connected to in series with a current sink.

3. The method of claim 1, further comprising temporarily elevating a battery voltage using a storage capacitor.

4. The method of claim 1, further comprising:
    opening the third switch, wherein when the third switch is opened, the second capacitor is charged toward the selected output voltage.

5. The method of claim 1, further comprising:
    opening the third switch and closing the second switch, wherein when the third switch is opened, the second capacitor is charged toward the selected output voltage.

6. The method of claim 1, further comprising:
charging a third capacitor toward the selected output voltage, wherein the third capacitor is coupled to the second node.

7. A method of selectively boosting an input voltage to an electronic device, comprising:
determining a crossover point for a ratio of output voltage to input voltage; and
enabling or disabling a voltage boost converter based on the voltage crossover point, point, wherein enabling the voltage boost converter includes:
applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
charging a first capacitor toward a selected output voltage, wherein the first capacitor is coupled to the first node and the fourth node,
opening the first switch, causing a rise in voltage to a value sufficient to conduct a diode, wherein the diode is coupled to the first node and the second node,
opening the second switch and closing the fourth switch, and
charging a second capacitor to twice the selected output voltage, wherein the second capacitor is coupled to the fifth node.

8. A method of operating an amplifier, comprising:
charging a second capacitor to a doubled output voltage;
isolating a battery input voltage from current demands of an amplifier; and
providing supply current from a storage capacitor,
wherein charging the second capacitor to the doubled output voltage includes:
applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
charging a first capacitor toward a selected output voltage, wherein the first capacitor is coupled to the first node and the fourth node,
opening the first switch, causing a rise in voltage to a value sufficient to conduct a diode, wherein the diode is coupled to the first node and the second node, and
opening the second switch and closing the fourth switch.

9. An apparatus for boosting input voltage to an electronic device, comprising:
an inductive boost converter circuit;
an assisted switched capacitor doubler circuit; and
a battery,
wherein the inductive boost converter circuit includes an inductor, a first switch, a diode, and a first capacitor, wherein the inductor and the first switch are coupled to a first node, wherein the diode is coupled to the first node and a second node, and wherein the first capacitor is coupled to the second node, and
wherein the assisted switched capacitor doubler circuit includes a second switch, a third switch, a fourth switch, a second capacitor, and a third capacitor, wherein the second switch is coupled to the second node and a third node, wherein the third switch is coupled to the third node and a fourth node, wherein the fourth switch is coupled to the third node and a fifth node, wherein the second capacitor is coupled to the first node and the fourth node, and wherein the third capacitor is coupled to the fifth node.

10. The apparatus of claim 9, further comprising a stack of light emitting diodes and a current sink.

11. An apparatus for boosting an input voltage to an electronic device, comprising:
means for applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node;
means for charging a first capacitor toward a selected output voltage, wherein the first capacitor is coupled to the first node and the fourth node;
means for opening the first switch, causing a rise in voltage to a value sufficient to conduct a diode, wherein the diode is coupled to the first node and the second node;
means for opening the second switch and closing the fourth switch; and
means for charging a second capacitor to twice the selected output voltage, wherein the second capacitor is coupled to the fifth node.

12. The apparatus of claim 11 further comprising means for driving a stack of light emitting diodes connected to in series with a current sink.

13. The apparatus of claim 11, further comprising means for temporarily elevating a battery voltage using a storage capacitor.

14. A apparatus for selectively boosting an input voltage to an electronic device, comprising:
means for determining a crossover point for a ratio of output voltage to input voltage; and
means for enabling or disabling a voltage boost converter based on the voltage crossover point, wherein the means for enabling the voltage boost converter includes:
means for applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
means for charging a first capacitor toward a selected output voltage, wherein the first capacitor is coupled to the first node and the fourth node,
means for opening the first switch, causing a rise in voltage to a value sufficient to conduct a diode, wherein the diode is coupled to the first node and the second node,
means for opening the second switch and closing the fourth switch, and
means for charging a second capacitor to twice the selected output voltage, wherein the second capacitor is coupled to the fifth node.

15. An apparatus for operating an amplifier, comprising:
 means for charging a second capacitor to a doubled output voltage;
 means for isolating a battery input voltage from current demands of an amplifier; and
 means for providing supply current from a storage capacitor,
 wherein charging the second capacitor to the doubled output voltage includes:
  means for applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
  means for charging a first capacitor toward a selected output voltage, wherein the first capacitor is coupled to the first node and the fourth node,
  means for opening the first switch, causing a rise in voltage to a value sufficient to conduct a diode, wherein the diode is coupled to the first node and the second node, and
  means for opening the second switch and closing the fourth switch.

16. A non-transitory computer readable medium containing instructions, which when executed by a processor cause the processor to perform steps for boosting an input voltage to an electronic device, comprising:
 applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node;
 charging a first capacitor toward a selected output voltage, wherein the first capacitor is coupled to the first node and the fourth node;
 opening the first switch, causing a rise in voltage to a value sufficient to conduct a diode, wherein the diode is coupled to the first node and the second node;
 opening the second switch and closing the fourth switch; and
 charging a second capacitor to twice the selected output voltage, wherein the second capacitor is coupled to the fifth node.

17. The non-transitory computer-readable medium of claim 16 further comprising instructions for driving a stack of light emitting diodes connected to in series with a current sink.

18. The non-transitory computer-readable medium of claim 16, further comprising instructions for temporarily elevating a battery voltage using a storage capacitor.

19. A non-transitory computer-readable medium containing instructions, which when executed by a processor, cause the processor to selectively boost an input voltage to an electronic device by performing the following steps:
 determining a crossover point for a ratio of output voltage to input voltage; and
 enabling or disabling a voltage boost converter based on the voltage crossover point, wherein enabling the voltage boost converter includes:
  applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
  charging a first capacitor toward a selected output voltage, wherein the first capacitor is coupled to the first node and the fourth node,
  opening the first switch, causing a rise in voltage to a value sufficient to conduct a diode, wherein the diode is coupled to the first node and the second node,
  opening the second switch and closing the fourth switch, and
  charging a second capacitor to twice the selected output voltage, wherein the second capacitor is coupled to the fifth node.

20. A non-transitory computer-readable medium containing instructions, which when executed by a processor, cause the processor to perform the following steps:
 charging a second capacitor to a doubled output voltage;
 isolating a battery input voltage from current demands of an amplifier; and
 providing supply current from a storage capacitor,
 wherein charging the second capacitor to the doubled output voltage includes:
  applying a voltage across an inductor as a first switch is closed, wherein the inductor and the first switch are coupled to a first node, wherein during the applying of the voltage a second switch and a third switch are closed and a fourth switch is opened, wherein the second switch is coupled to a second node and a third node, wherein the third switch is coupled to the third node and a fourth node, and wherein the fourth switch is coupled to the third node and a fifth node,
  charging a first capacitor toward a selected output voltage, wherein the first capacitor is coupled to the first node and the fourth node,
  opening the first switch, causing a rise in voltage to a value sufficient to conduct a diode, wherein the diode is coupled to the first node and the second node, and
  opening the second switch and closing the fourth switch.

* * * * *